UNITED STATES PATENT OFFICE.

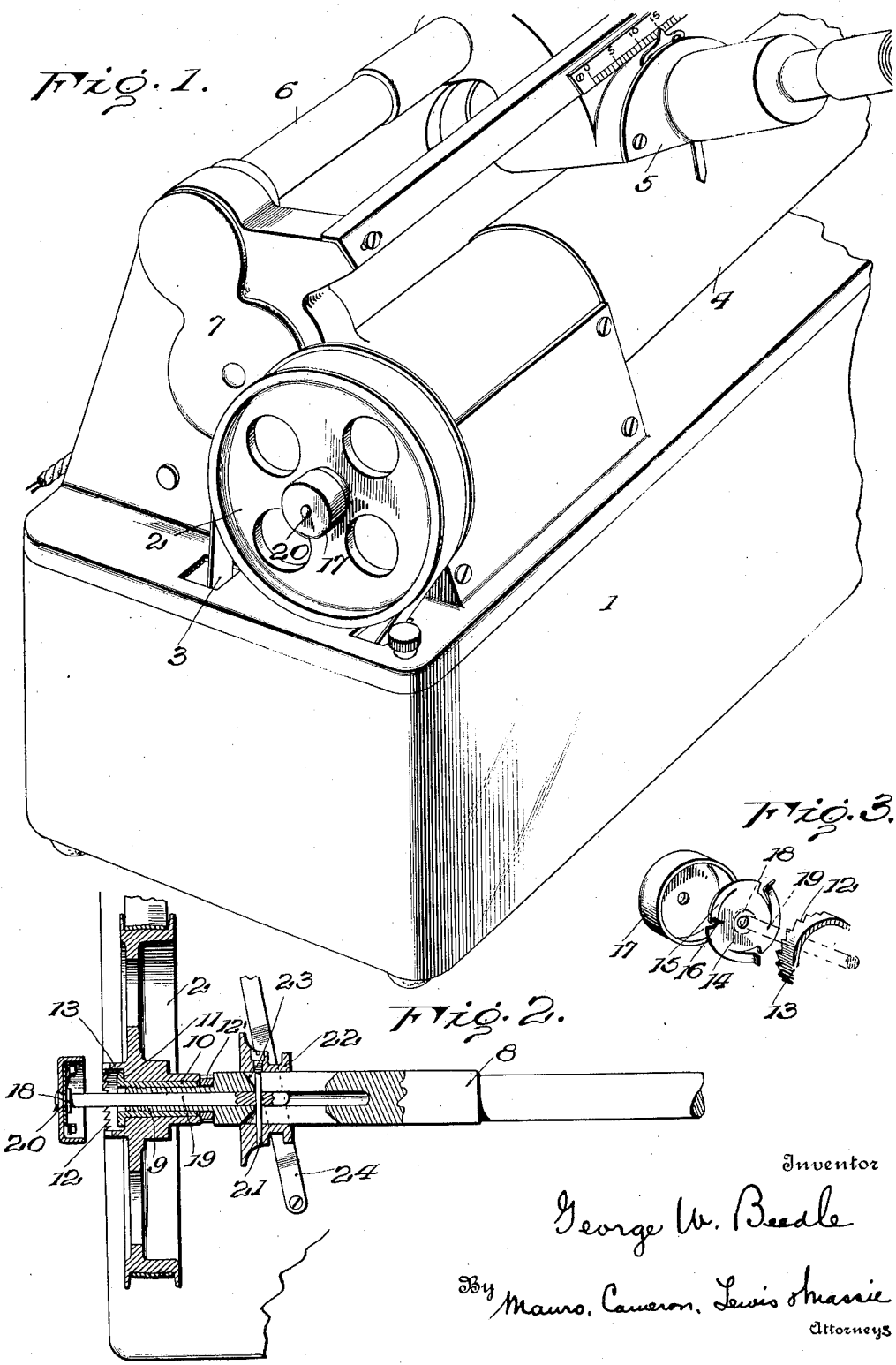

GEORGE W. BEADLE, OF NEW ROCHELLE, NEW YORK, ASSIGNOR TO COLUMBIA GRAPHOPHONE MANUFACTURING COMPANY, OF BRIDGEPORT, CONNECTICUT, A CORPORATION OF DELAWARE.

RESILIENT CLUTCH FOR PHONOGRAPHS.

1,382,406.  Specification of Letters Patent.  Patented June 21, 1921.

Application filed April 20, 1918. Serial No. 229,824.

*To all whom it may concern:*

Be it known that I, GEORGE W. BEADLE, a citizen of the United States of America, and a resident of New Rochelle, New York, have invented a new and useful Improvement in Resilient Clutches for Phonographs, which invention is fully set forth in the following specification.

This invention relates to a clutch especially adapted for phonographic machines of the type used for dictation purposes, and has for an object to provide an improved device of this type.

Heretofore it has been the custom to provide phonographs of this type with a clutch composed of two members one of which is movable axially into engagement with the other, both of said members being provided with rigid engaging elements, either of the saw-tooth type or in the form of radial and axial pins. In these machines, however, the driven member which is to be clutched with the constantly rotating driving member, is operatively connected to a mandrel carrying the record-tablet and to a feed-screw for propelling a carriage on which is mounted the sound-box or boxes, which elements together possess considerable inertia. With the type of clutch heretofore in use, the tips of the rigid projections frequently come into contact with hammer-like blows without coming into firm and complete engagement, whereupon the movable clutch member is frequently thrown back by such blows resulting in the tablet and sound-box receiving a false start.

It is an object of this invention to provide a clutch which will overcome these defects and enable the clutch members to be brought immediately into proper driving relation.

Other objects relate to the provision of a clutch of the character described which is simple in construction, inexpensive to manufacture, easy to install, and efficient in operation.

Stated broadly, the invention comprises a clutch composed of two members one of which is movable axially into engagement with the other, one of said members being provided with rigid engaging elements while the other of said members is provided with resilient engaging elements, the latter member also preferably having a rigid backing element to support the resilient elements in engagement with the rigid elements.

The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

In said drawing—

Figure 1 is a perspective of a dictating machine of any suitable construction provided with a clutch in accordance with the present invention;

Fig. 2 is an axial section through the clutch and the driving and driven elements;

Fig. 3 is a perspective view of the clutch members in separated relationship.

Referring in detail to the drawing, wherein the same reference characters designate corresponding parts in the several figures, 1 represents the casing, of a dictating machine of any suitable construction, for inclosing the motor; 2 a driving pulley rotated by the motor, as by a belt 3; 4 the usual mandrel for carrying a record-tablet; 5 a sound-box carriage, and 6 the back rod within which is the feed-screw for traversing said sound-box carriage, the feed-screw being suitably driven by gearing within the housing 7.

8 designates a driven shaft which, in the illustrated embodiment, is the shaft upon which is mounted the mandrel 4. Mounted on said shaft and freely revoluble thereon is the aforesaid driving pulley 2, any suitable means being provided for mounting said pulley on said shaft whereby the same may rotate thereon. In the form shown, the shaft 8 is reduced at 9 and carries a sleeve 10 provided with a flange 11 between which and the usual gear 12' said pulley is mounted.

A clutch is provided for connecting the driving member, *i. e.*, the pulley 2, to the driven member, i. e., the shaft 8, said clutch comprising two members one of which is movable axially into engagement with the other. In the form shown, one of said members comprises a plurality of rigid saw-teeth 12 on an axial flange 13 shown as integral with the hub of the pulley 2. The other of said members preferably comprises a disk or plate 14 of spring-steel, cut to provide a plurality of arcuate resilient fingers or strips 15 projecting substantially tangentially from the rim of the disk and having their free ends bent at steep angles as shown at 16 to provide teeth for engagement with the saw-teeth 12. While three teeth have been shown as cut and bent from the spring plate 14, it is to be understood that the invention is not limited to the use of three teeth, as the number may be varied as desired.

Said plate is preferably backed with a rigid element comprising a cap member 17 sufficiently rigid to prevent axial displacement of the free ends of said fingers beyond the plane of said disk or plate. This disk or plate 14 is suitably held contiguous to said cap member 17, as by a collar 18 on the clutch-shifting rod 19, which is shown as having a reduced end 20 extending through said cap member and headed over at the outer face thereof.

Any suitable means may be provided for moving the cap member 17 and spring plate 14 into and out of engagement with the rigid teeth 12 on the flange 13. In the form shown, the clutch rod 19 extends axially through the cored end of the shaft 8 and is suitably connected, as by a pin 21, to a clutch-shifting sleeve 22 slidable on the shaft 8 but not rotatable thereon owing to the coaction of said pin 21 with the slot 23 formed in said shaft. Any suitable means, as a lever 24, may be provided for shifting the sleeve 22 longitudinally of the shaft 8.

In operation, if the bent-up ends 16 of the arcuate resilient fingers 15 engage the tips of the rigid projection 12 when the clutch members are moved into clutched relationship, said fingers will give while the pulley is moving the rigid teeth rotatively relatively thereto, whereupon they will immediately thereafter snap into engagement with said rigid teeth and transmit the rotative effort to the driven elements without causing the movable clutch member to spring backwardly with the resultant causing of the record-tablet and sound-box to have a false start. Continued movement of the disk 14 toward the rigid teeth 12 will bring the fingers and disk into the common plane defined by the backing member 17 whereupon the bent ends 16 function substantially like any non-axially-yieldable clutch teeth.

It will now be seen that the clutch is of such character that immediate connection may be effected between the driving and driven members without preliminary hammering contact between the clutch teeth and that the clutch lever 24 need not be jerked to insure positive clutching connection. This desirable condition follows from the fact that there is an axially yieldable mechanism behind one set of clutch teeth. It will be further appreciated that a clutch of this character is particularly desirable in phonographic machines since false starting of the tablet is practically if not entirely eliminated.

While the illustrated embodiment has been described with considerable detail, it is to be expressly understood that the invention is not restricted thereto, as the same is capable of receiving a variety of mechanical expressions some of which will readily suggest themselves to those skilled in the art. Thus, while the resilient elements have been shown mounted on the movable of the two clutch members, it is within the purview of the invention to mount the resilient elements on the relatively stationary member of the clutch and to move the rigid elements or teeth into and out of engagement therewith. Reference is therefore to be had to the claims hereto appended for a definition of the limits of the invention.

What is claimed is:—

1. In a clutch, the combination with a member provided with engaging elements, of a member provided with resilient arcuate elements integrally formed therewith and a rigid backing element for said resilient elements, and means to move one of said members relatively to the other to engage said resilient elements with said engaging elements.

2. In a clutch, the combination with a member provided with rigid teeth, of a member comprising a plate provided with resilient arcuate elements constituting spring teeth, and means to move one of said members relatively to the other to engage said spring teeth with said rigid teeth.

3. In a clutch, the combination with a member provided with rigid teeth, of a member comprising a plate provided with resilient arcuate elements constituting spring teeth and a rigid backing element for said spring teeth, and means to move one of said members relatively to the other to engage said spring teeth with said rigid teeth.

4. In a clutch, the combination with a member having teeth, of a spring-metal disk having a strip pressed out at an angle to the plane of the disk, means carried by the free end of the strip for engaging the aforesaid teeth and means backing the disk on the side remote from the aforesaid teeth.

5. In a clutch, the combination with a clutch member having axially disposed teeth, of a clutch member comprising a disk adapted to be shifted to position adjacent said teeth, tangentially-extending and obliquely-arranged spring-strips carried by said disk, teeth on the free ends of said strips for co-operative engagement with the aforesaid teeth, and an abutment behind the strips for limiting the axial movement of the free ends of said strips.

In testimony whereof I have signed this specification.

GEORGE W. BEADLE.